United States Patent
Gamble et al.

(10) Patent No.: US 9,649,700 B2
(45) Date of Patent: May 16, 2017

(54) METHOD FOR MANUFACTURING AN INSERT-RECEIVING POCKET WALL WITH A COMPOUND RADIUS

(71) Applicant: Kennametal Inc., Latrobe, PA (US)

(72) Inventors: Kevin Michael Gamble, Stahlstown, PA (US); Lewis Ray Morrison, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 408 days.

(21) Appl. No.: 13/845,403

(22) Filed: Mar. 18, 2013

(65) Prior Publication Data

US 2014/0271011 A1    Sep. 18, 2014

(51) Int. Cl.
| | |
|---|---|
| *B23B 27/10* | (2006.01) |
| *B23C 3/36* | (2006.01) |
| *B23C 5/22* | (2006.01) |
| *B23C 3/16* | (2006.01) |
| *B23B 27/16* | (2006.01) |
| *B23C 3/10* | (2006.01) |

(52) U.S. Cl.
CPC .......... *B23C 3/36* (2013.01); *B23B 27/1662* (2013.01); *B23C 3/16* (2013.01); *B23C 5/22* (2013.01); *B23C 5/2208* (2013.01); *B23B 2205/12* (2013.01); *B23C 2200/045* (2013.01); *B23C 2210/168* (2013.01); *Y10T 407/22* (2015.01); *Y10T 409/303752* (2015.01)

(58) Field of Classification Search
CPC ....... G05B 19/40937; B23C 3/36; B23C 3/16; B23C 5/22; B23C 5/2208; B23B 27/1622
USPC .......................................... 82/1.11; 409/132
See application file for complete search history.

(56) References Cited

U.S. PATENT DOCUMENTS

| | | | |
|---|---|---|---|
| 3,996,651 A | 12/1976 | Heaton et al. | |
| 4,497,144 A * | 2/1985 | Kobayashi | B24B 13/00 264/2.5 |
| 5,759,140 A * | 6/1998 | Egbert | B23B 41/12 29/26 A |
| 6,234,724 B1 | 5/2001 | Satran et al. | |
| 6,238,133 B1 * | 5/2001 | DeRoche | B23C 5/2221 403/359.1 |
| 6,428,252 B1 * | 8/2002 | Oldani | B23C 3/00 318/570 |
| 6,535,788 B1 * | 3/2003 | Yoshida | G05B 19/40931 700/180 |
| 6,926,472 B2 | 8/2005 | Arvidsson | |

(Continued)

FOREIGN PATENT DOCUMENTS

WO    2010126430 A1    11/2010

*Primary Examiner* — Will Fridie, Jr.
(74) *Attorney, Agent, or Firm* — Ian K. Samways

(57) ABSTRACT

A method for manufacturing a sidewall support surface of an insert-receiving pocket with a compound radius includes the steps of: 1) tilting a cutting tool at a primary tilt angle with respect to a first plane (x-z); 2) tilting the cutting tool at a secondary tilt angle with respect to a second plane (y-z), the second plane different than the first plane; and 3) rotating the cutting tool about an axis (z-axis) perpendicular to a pocket floor of the insert-receiving pocket while maintaining the first and second tilt angles. A cutting tool including a toolholder with the insert-receiving pocket having a pocket floor and the sidewall support surface formed with a compound radius is also described.

12 Claims, 5 Drawing Sheets

(56) References Cited

U.S. PATENT DOCUMENTS

| | | | |
|---|---|---|---|
| 7,198,437 B2 | 4/2007 | Jonsson | |
| 7,255,518 B2 | 8/2007 | Wallstrom et al. | |
| 7,831,332 B2 * | 11/2010 | Diehl | G05B 19/40937 700/173 |
| 8,147,171 B2 | 4/2012 | Dufour et al. | |
| 8,295,972 B2 * | 10/2012 | Coleman | G05B 19/40937 700/173 |
| 8,694,149 B2 * | 4/2014 | Diehl | G05B 19/40937 409/132 |
| 8,882,402 B2 * | 11/2014 | Hoffer | B23C 5/2221 407/113 |
| 9,186,733 B2 * | 11/2015 | Riviere | B23C 5/109 |
| 2004/0105731 A1 * | 6/2004 | Kreh | B23F 9/00 409/51 |
| 2010/0054873 A1 * | 3/2010 | Men | B23C 5/202 407/42 |
| 2013/0205947 A1 * | 8/2013 | Takahashi | B23Q 1/5406 74/665 B |

* cited by examiner

METHOD FOR MANUFACTURING AN INSERT-RECEIVING POCKET WALL WITH A COMPOUND RADIUS

BACKGROUND OF THE INVENTION

The invention relates in general to a pocket wall for a cutting tool, and in particular to a method for manufacturing a pocket wall having a compound radius for mounting a cutting insert therein.

It is known that cutting inserts include sidewall(s) that are formed at a clearance angle with respect to the central axis of the cutting insert to provide clearance for the cutting insert when mounted in a toolholder. Unfortunately, the clearance angle of the sidewall(s) varies during the manufacturing of the cutting insert, particularly for round cutting inserts. This inaccuracy of the clearance angle of the sidewall(s) creates a problem when designing a sidewall support surface for the insert-receiving pocket of the toolholder. It has been observed, for example, that the corner of the insert-receiving pocket may contact the cutting insert and deform during cutting operations.

SUMMARY OF THE INVENTION

The problem of designing a sidewall support surface for an insert-receiving pocket of a toolholder independent of the accuracy of the clearance angle of the sidewall of the cutting insert is solved by manufacturing a sidewall of the insert-receiving pocket with a compound radius having a substantially toroidal cross-sectional shape.

In one aspect of the invention, a method for manufacturing a sidewall support surface of an insert-receiving pocket with a compound radius, comprising:
tilting a cutting tool at a primary tilt angle with respect to a first plane;
tilting the cutting tool at a secondary tilt angle with respect to a second plane, the second plane different than the first plane; and
rotating the cutting tool about an axis perpendicular to a pocket floor of the insert-receiving pocket while maintaining the first and second tilt angles.

In another aspect, a sidewall support surface of an insert-receiving pocket of a toolholder is formed with the method of the invention.

In yet another aspect, a cutting tool comprises a toolholder with an insert-receiving pocket for mounting a cutting insert thereon. The insert-receiving pocket has a pocket floor and a sidewall support surface formed with a compound radius.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
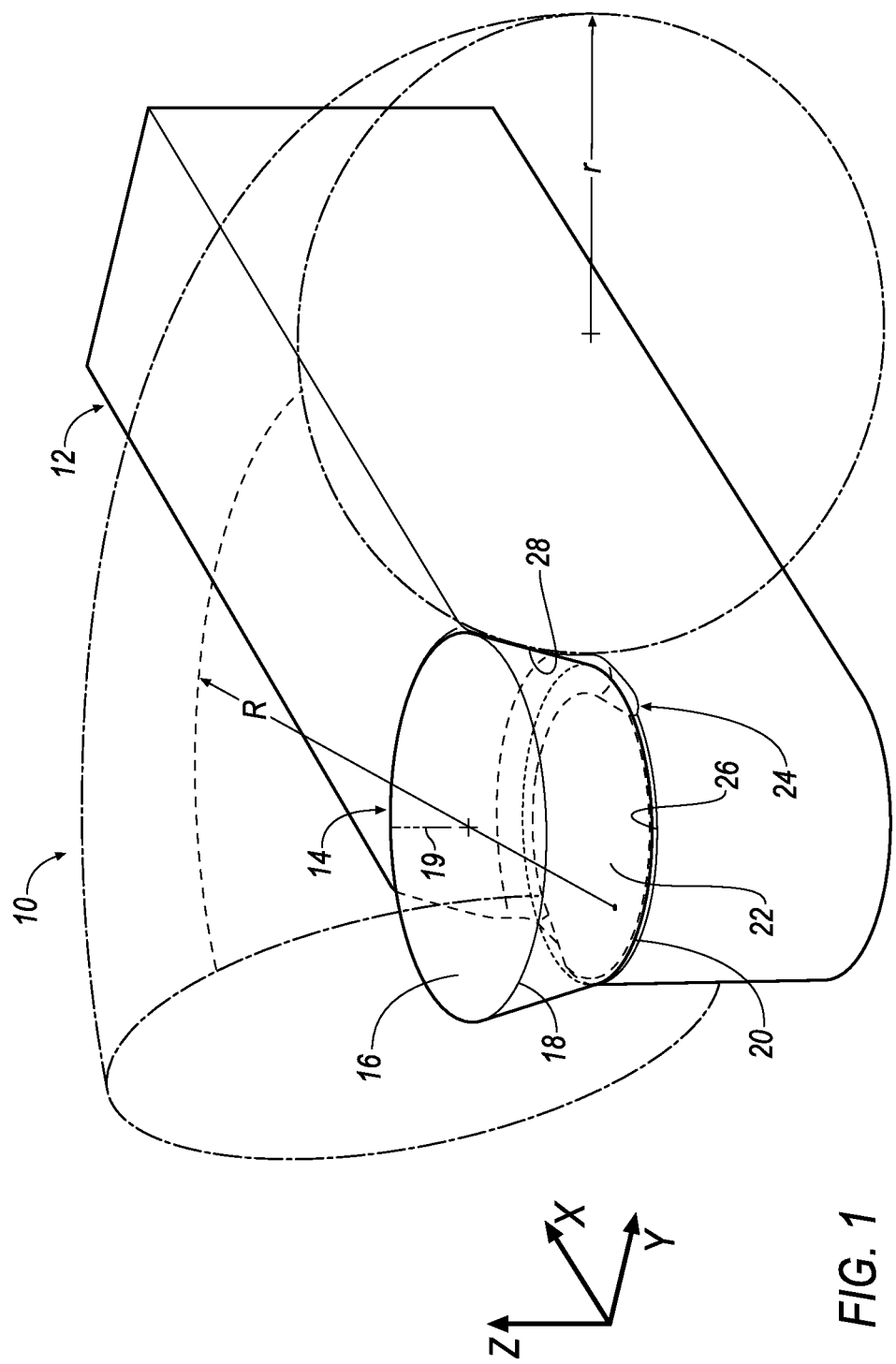
FIG. 1 shows a toolholder with an insert-receiving pocket with a compound radius according to an embodiment of the invention.
Figure 2:
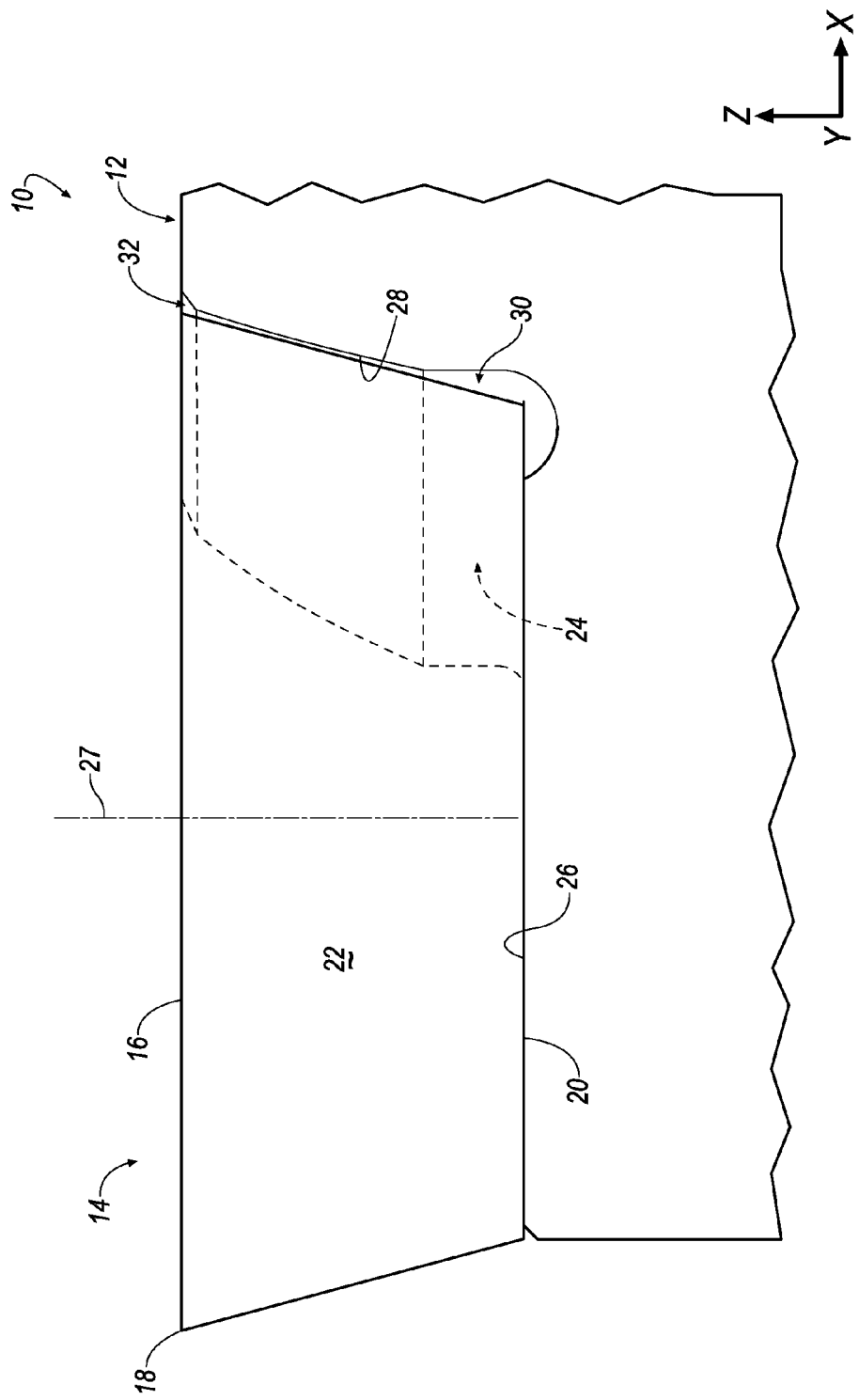
FIG. 2 shows an enlarged side view of the insert-receiving pocket with a compound radius of FIG. 1.

Referring now to FIGS. 1 and 2, a cutting tool 10 includes a toolholder 12 and a cutting insert 14 mounted thereto. The toolholder 12 is generally manufactured from steel, and the cutting insert 14 is generally manufactured by form pressing and sintering a cemented carbide, such as tungsten carbide, and can be coated or uncoated.

In general, the round cutting insert 14 has a top surface 16 that terminates in a circular cutting edge 18, a central axis 19, and a bottom surface 20. The top surface 16 acts as a rake surface during a cutting operation. The insert 14 further has a frusto-conical sidewall 22 interconnecting the top surface 16 and the bottom surface 20. A screw hole (not shown) may be centrally disposed through the top and bottom surfaces 16, 20 of the insert 14 for receiving a threaded shank of a clamping screw (not shown). Although a round cutting insert with a frusto-conical sidewall is shown in the illustrated embodiment, it will be appreciated that the principles of the invention can be applied to a round cutting insert with a cylindrical sidewall that is perpendicular to the top and bottom surfaces.

The cutting insert 14 is suitable to be mounted on an insert-receiving pocket 24 of the toolholder 12. In general, the insert-receiving pocket 24 has a pocket floor 26 that engages the bottom surface 20 of the cutting insert 14, and a sidewall support surface 28 that engages the frusto-conical sidewall 22 of the cutting insert 14 when the cutting insert 14 is mounted in the insert-receiving pocket 24. As shown in FIG. 2, the insert-receiving pocket 24 has a central axis 27 that is parallel to the z-axis and substantially perpendicular to the pocket floor 26. It should be noted that the central axis 19 of the cutting insert 14 is substantially parallel to the central axis 27 of the insert-receiving pocket 24 when the cutting insert 14 is mounted in the insert-receiving pocket 24.

One aspect of the invention is that the sidewall 28 of the insert-receiving pocket 24 is formed with a compound radius that provides superior support for the cutting insert 14. In other words, the sidewall support surface 28 of the insert-receiving pocket 24 is formed with a generally toroidal cross-sectional shape (i.e. a "compound radius") that provides superior support for the cutting insert 14 regardless of the variation in the clearance angle of the frusto-conical sidewall 22 of the cutting insert 14. It will be appreciated that the principles of the invention can be applied to a cutting insert having a clearance angle of zero (0) degrees, i.e., having a cylindrical sidewall that is substantially perpendicular to at least one of the top and bottom surfaces of the cutting insert.

Because the sidewall support surface 28 is formed with a compound radius, the sidewall 22 of the cutting insert 14 engages the sidewall support surface 28 between a first end 30 and a second, opposite end 32 of the sidewall support surface 28. That is, a gap exists between the sidewall 22 of the cutting insert 14 and the ends 30, 32 of the sidewall support surface 28 of the insert-receiving pocket 24 due to the sidewall support surface 28 being formed with a compound radius. The size of the gap at each end 30, 32 depends on the major radius (R) and the minor radius (r) of the sidewall support surface 28.

Figure 3:
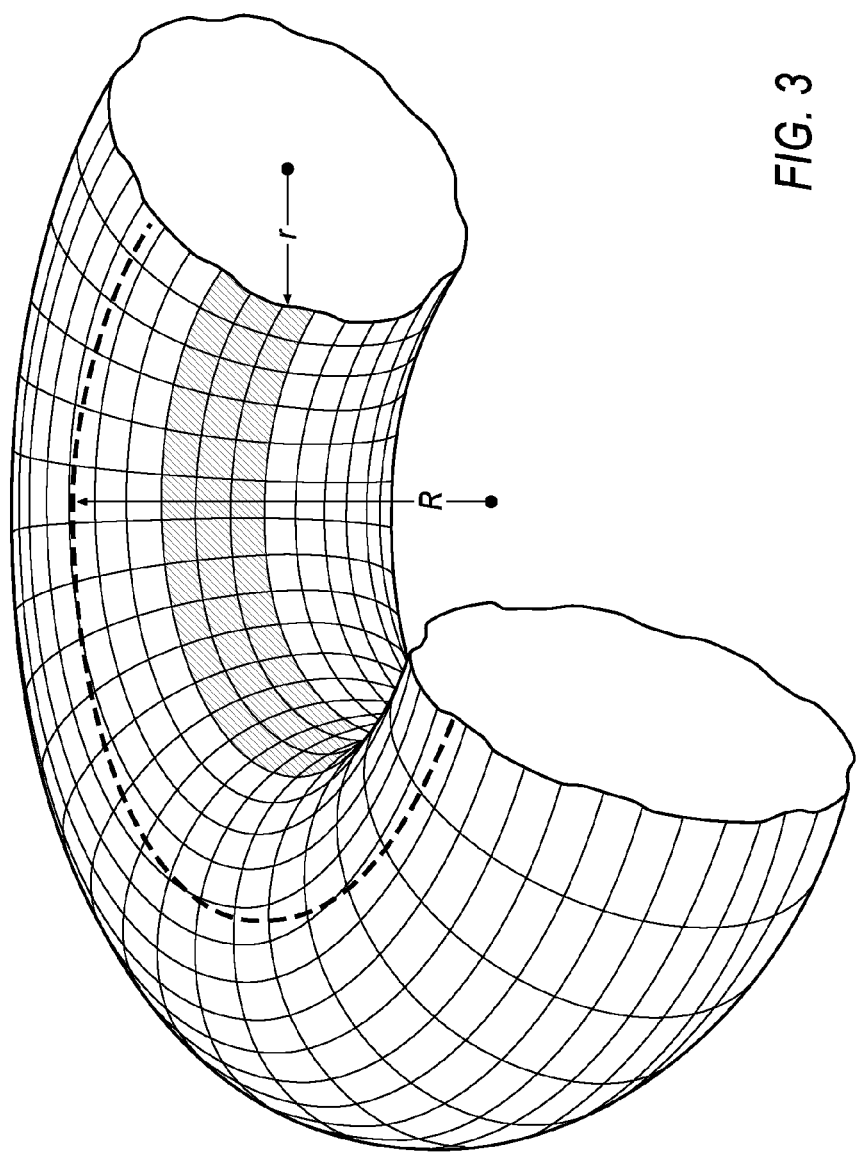
FIG. 3 shows a cross-sectional view of a torus having a compound radius.

Referring now to FIG. 3, as used herein, a torus (pl. tori) is a surface of revolution generated by revolving a circle in three-dimensional space about an axis coplanar with the circle. If the axis of revolution does not touch the circle, the surface has a ring shape and is called a ring torus or simply torus if the ring shape is implicit.

When the axis is tangent to the circle, the resulting surface is called a horn torus; when the axis is a chord of the circle, it is called a spindle torus. A degenerate case is when the axis is a diameter of the circle, which simply generates the surface of a sphere. The ring torus bounds a solid known as a toroid. The adjective toroidal can be applied to tori, toroids or, more generally, any ring shape as in toroidal inductors and transformers. Real-world examples of (approximately) toroidal objects include doughnuts, vadais, inner tubes, bagels, many lifebuoys, O-rings and vortex rings.

A torus can be defined parametrically by:

$$x(\theta,\phi)=(R+r\cos\phi)\cos\theta \qquad (\text{Eq. 1})$$

$$y(\theta,\phi)=(R+r\cos\phi)\sin\theta \qquad (\text{Eq. 2})$$

$$z(\theta,\phi)=r\sin\phi \qquad (\text{Eq. 3})$$

where $\theta$, $\phi$ are angles which make a full circle, starting at 0 and ending at $2\pi$, so that their values start and end at the same point, R is the distance from the center of the tube to the center of the torus, and r is the radius of the tube.

R and r are also known as the "major radius" and "minor radius", respectively. The ratio of the two radii is known as the "aspect ratio". A doughnut has an aspect ratio of about 2 to 3.

An implicit equation in Cartesian coordinates for a torus radially symmetric about the z-axis is $$(R-\sqrt{x^2+y^2})^2+z^2=r^2, \qquad (\text{Eq. 4})$$

or the solution of f(x, y, z)=0, where $$f(x,y,z)=(R-\sqrt{x^2+y^2})^2+z^2-r^2. \qquad (\text{Eq. 5})$$

Algebraically eliminating the square root gives a quark equation, $$(x^2+y^2+z^2+R^2-r^2)^2=4R^2(x^2+y^2). \qquad (\text{Eq. 6})$$

The three different classes of standard tori correspond to the three possible relative sizes of r and R. When R>r, the surface will be the familiar ring torus. The case R=r corresponds to the horn torus, which in effect is a torus with no "hole". The case R<r describes the self-intersecting spindle torus. When R=0, the torus degenerates to the sphere.

The surface area and interior volume of this torus are easily computed using Pappus's centroid theorem giving $$A=4\pi^2Rr=(2\pi r)(2\pi R) \qquad (\text{Eq. 7})$$

$$V=2\pi^2Rr^2=(\pi r^2)(2\pi R). \qquad (\text{Eq. 8})$$

These formulas are the same as for a cylinder of length $2\pi R$ and radius r, created by cutting the tube and unrolling it by straightening out the line running around the center of the tube. The losses in surface area and volume on the inner side of the tube exactly cancel out the gains on the outer side.

As a torus is the product of two circles, a modified version of the spherical coordinate system is sometimes used. In traditional spherical coordinates there are three measures, R, the distance from the center of the coordinate system, and $\theta$ and $\phi$, angles measured from the center point. As a torus has, effectively, two center points, the center points of the angles are moved; $\phi$ measures the same angle as it does in the spherical system, but is known as the "toroidal" direction. The center point of $\theta$ is moved to the center of r, and is known as the "poloidal" direction. These terms were first used in a discussion of the Earth's magnetic field, where "poloidal" was used to denote "the direction toward the poles". In modern use these terms are more commonly used to discuss magnetic confinement fusion devices.

Typically, the sidewall support surface of the pocket is formed by tilting a cutting tool, such as an end mill and the like, at a tilt angle with respect to a single x-z plane. For example, the tilt angle can be between about zero (0) degrees to about fifteen (15) degrees. Then, the cutting tool is rotated about a center axis of the pocket that is substantially perpendicular to the pocket floor while maintaining the single tilt angle of the cutting tool. The sidewall support surface of the insert-receiving pocket that is formed is generally frusto-conical and has the same angle as the tilt angle of the cutting tool. In addition, the primary tilt angle is typically equal to the clearance angle of the cutting insert. For example, a generally frusto-conical sidewall support surface with an angle of fifteen (15) degrees with respect to the z-axis is formed for the cutting tool having a tilt angle of fifteen (15) degrees, which is equal to the clearance angle of the sidewall of the cutting insert.

The inventors of the present invention have discovered a simple method of manufacturing the sidewall support surface 28 of the insert-receiving pocket 24 with a substantially toroidal cross-sectional shape (i.e. a "compound radius").

Figure 4A:
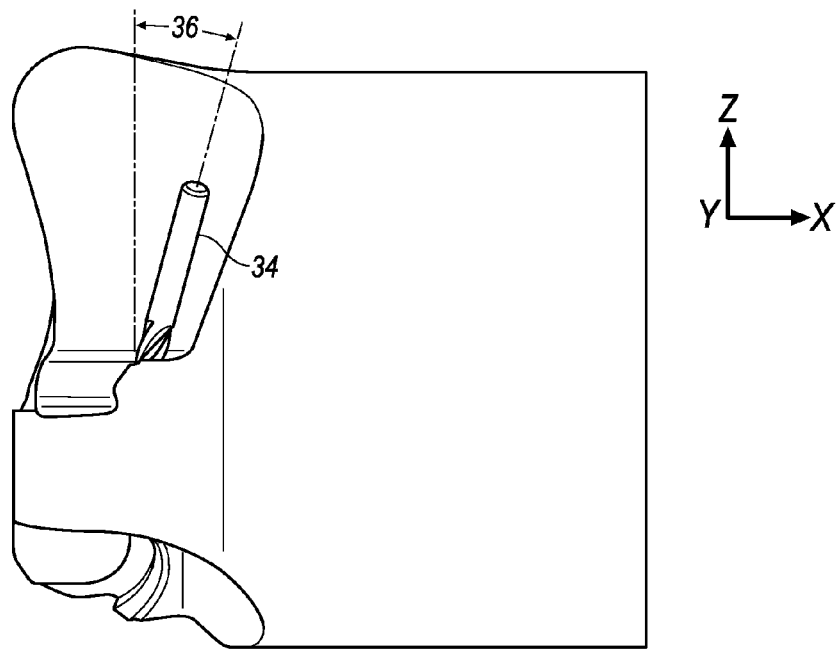
FIG. 4(A) shows a side view of an insert-receiving pocket being formed with a cutting tool angled at a primary tilt angle with respect to the x-z plane according to a method of the invention.
Figure 4B:
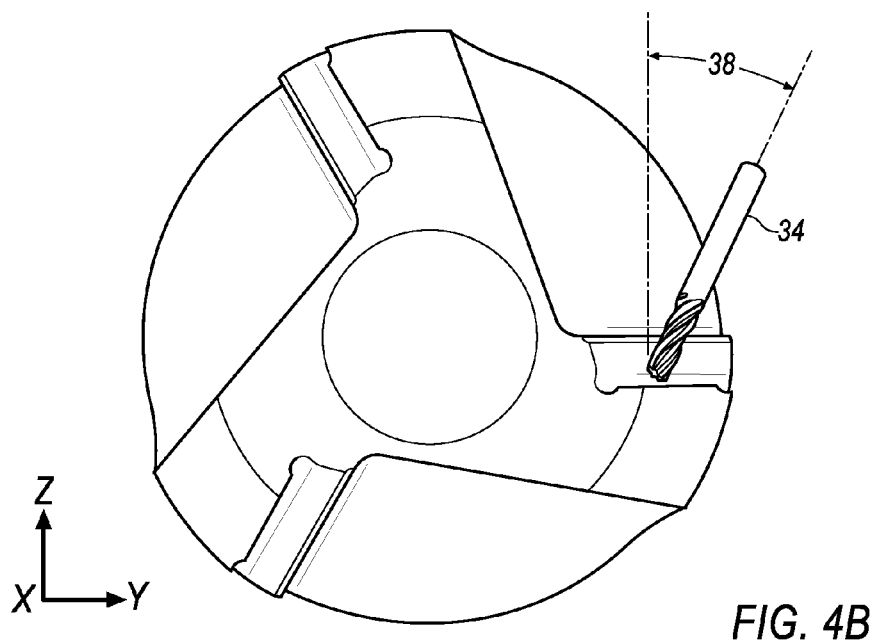
FIG. 4(B) shows a front view of the insert-receiving pocket being formed with the cutting tool angled at a secondary tilt angle with respect to the y-z plane according to the method of the invention.
Figure 5A:
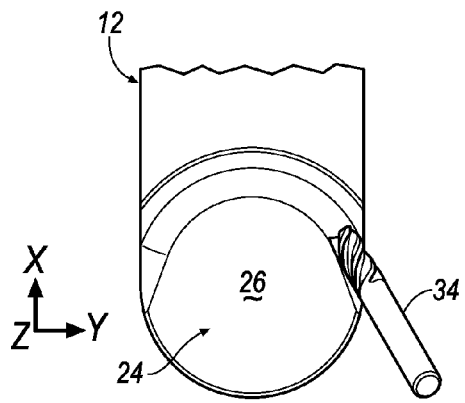
FIGS. 5(A)-(D) show a top view of the insert-receiving pocket being formed with a compound radius according to the method of the invention.
Figure 5B:
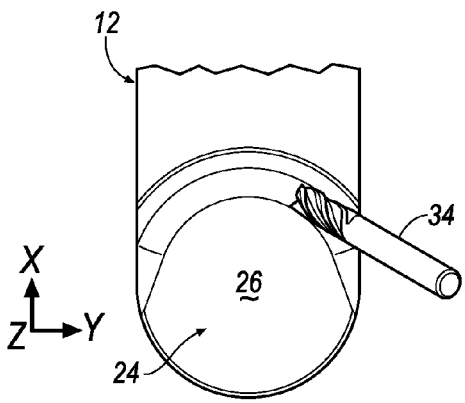
Figure 5C:
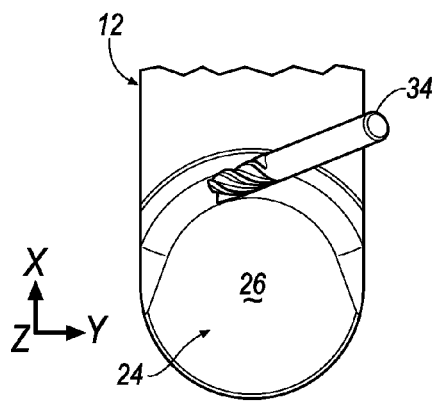
Figure 5D:
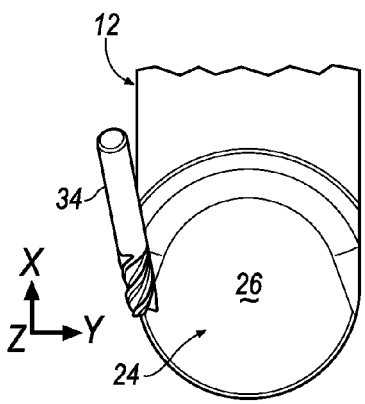

Referring now to FIGS. 4(A) and 4(B), a method of manufacturing the sidewall support surface 28 of the insert-receiving pocket 24 with a compound radius will now be described. Initially, a cutting tool 34, such as an end mill, is oriented at a primary tilt angle 36 with respect to the x-z plane, similar to the conventional method described above. In addition, the cutting tool is also oriented at a secondary tilt angle 38 with respect to a y-z plane. Thus, the cutting tool in the method of the invention is oriented with respect to two planes (x-z plane and y-z plane), rather than a single plane (x-z plane) as in the conventional method. Then, the cutting tool is rotated about the z-axis that is perpendicular to the pocket floor 26 of the insert-receiving pocket 24, as shown in FIGS. 5(A)-(D). The tilting of the cutting tool with respect to two planes (y-z plane and the x-z plane), rather than just one plane, results in the sidewall support surface 28 of the insert-receiving pocket 24 to be formed with a compound radius having a substantially toroidal cross-sectional shape.

In one embodiment, the primary tilt angle 36 with respect to the x-z plane can be in a range between about zero (0) degrees to about twenty-five (25) degrees, and the secondary tilt angle 38 with respect to the x-z plane can be in a range between about zero (0) degrees and about thirty-five (35) degrees. The magnitude of the primary and secondary tilt angles 36, 38 determine the dimensions of the major radius (R) and minor radius (r) of the sidewall support surface 28 of the insert-receiving pocket 24 for a cutting insert having the same inscribed circle (IC).

Table I shows the dimensions of the major radius (R) and the minor radius (r) as a function of primary tilt angle 36 and secondary tilt angle 38 for a cutting insert having three different inscribed circle (IC) dimensions. As shown in Table I, the major radius (R) and the minor radius (r) increases when the secondary tilt angle 38 decreases and the primary tilt angle 36 remains the same for a cutting insert having a particular inscribed circle (IC) dimension. For example, the major radius (R) and the minor radius (r) is 74.86 and 68.86, respectively, for a secondary tilt angle of 15 degrees, and the major radius (R) and the minor radius (r) is 15.55 and 9.55, respectively, for a secondary tilt angle 38 of thirty-five (35) degrees. In other words, positioning the cutting tool 34 at a relatively larger secondary tilt angle 38 results in the sidewall support surface 28 of the insert-receiving pocket 24 to have a more pronounced toroidal cross-sectional shape having a relatively smaller major radius (R) and a relatively smaller minor radii (r).

TABLE I

INSERT AND POCKET SIDEWALL DATA

| Insert Data | | | Pocket Sidewall Data | | |
|---|---|---|---|---|---|
| Insert IC (mm) | Insert Thickness (mm) | Insert Clearance Angle (degrees) | Endmill Secondary-tilt Angle (degrees) | Toroidal Wall Major Radius (R) (mm) | Toroidal Wall Minor Radius (r) (mm) |
| 12 | 4 | 0° | 15° | 74.86 | 68.86 |
| 12 | 4 | 0° | 35° | 15.55 | 9.55 |
| 12 | 4 | 11° | 15° | 68.12 | 63.71 |
| 12 | 4 | 11° | 35° | 14.18 | 8.75 |
| 12 | 4 | 15° | 15° | 65.40 | 62.08 |
| 12 | 4 | 15° | 35° | 13.61 | 8.45 |
| 18 | 6 | 0° | 15° | 119.56 | 110.56 |
| 18 | 6 | 0° | 35° | 24.52 | 15.53 |
| 18 | 6 | 11° | 15° | 113.01 | 106.39 |
| 18 | 6 | 11° | 35° | 23.19 | 14.89 |
| 18 | 6 | 15° | 15° | 110.49 | 105.68 |
| 18 | 6 | 15° | 35° | 22.67 | 14.75 |
| 25 | 8 | 0° | 15° | 171.77 | 159.27 |
| 25 | 8 | 0° | 35° | 35.10 | 22.60 |
| 25 | 8 | 11° | 15° | 165.31 | 156.11 |
| 25 | 8 | 11° | 35° | 33.78 | 22.12 |
| 25 | 8 | 15° | 15° | 162.89 | 156.30 |
| 25 | 8 | 15° | 35° | 33.29 | 22.12 |

As described above, a simple method for forming a sidewall support surface with a substantially toroidal cross-sectional shape (i.e. a "compound radius") for an insert-receiving pocket of a toolholder can be achieved by tilting the cutting tool 34 with respect to two planes (x-z and y-z), rather than tilting the cutting tool with respect to only a single plane that results a frusto-conical sidewall support surface.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method for manufacturing a sidewall support surface of an insert-receiving pocket with a compound radius, comprising:
   tilting a cutting tool at a selectable primary tilt angle with respect to a first plane (x-z);
   tilting the cutting tool at a selectable secondary tilt angle with respect to a second plane (y-z), the second plane being different than the first plane and perpendicular with respect to the first plane; and
   rotating the cutting tool about an axis (z-axis) that is perpendicular to a pocket floor of the insert-receiving pocket and lies in parallel with respect to the first and second planes, while maintaining the first and second tilt angles, thereby removing material from a sidewall support surface of an insert-receiving pocket of a toolholder,
   whereby the sidewall support surface of the insert-receiving pocket of the toolholder is formed to be convex, with a cross-sectional shape defined by a compound radius and corresponding to a portion of a ring torus.

2. The method according to claim 1, wherein the primary tilt angle is between zero (0) degrees and twenty-five (25) degrees.

3. The method according to claim 1, wherein the secondary tilt angle is between zero (0) degrees and thirty-five (35) degrees.

4. The method according to claim 1, wherein the primary tilt angle is less than or equal to the secondary tilt angle.

5. A sidewall support surface of an insert-receiving pocket of a toolholder formed with the method of claim 1.

6. The method according to claim 1, wherein the cutting tool is an end mill.

7. The method according to claim 1, wherein the primary tilt angle is selected to be substantially equal to a clearance angle of a cutting insert to be mounted at the insert-receiving pocket.

8. The method according to claim 1, wherein the compound radius is defined by a minor radius and a major radius.

9. The method according to claim 8, wherein the secondary tilt angle is selected to influence the minor radius and the major radius.

10. The method according to claim 9, wherein, for a given primary tilt angle, a decrease in the secondary tilt angle corresponds to an increase in the minor radius and the major radius.

11. The method according to claim 10, wherein the cutting tool is an end mill.

12. The method according to claim 8, wherein the minor radius defines a radius of curvature of the sidewall support surface.

* * * * *